United States Patent
Kennedy

(10) Patent No.: US 11,098,814 B2
(45) Date of Patent: Aug. 24, 2021

(54) STEM COUPLING

(71) Applicant: Kennedy Valve Company, Elmira, NY (US)

(72) Inventor: Paul Kennedy, Horseheads, NY (US)

(73) Assignee: Kennedy Valve Company, Elmira, NY (US)

(*) Notice: Subject to any disclaimer, the term of this patent is extended or adjusted under 35 U.S.C. 154(b) by 578 days.

(21) Appl. No.: 16/056,909

(22) Filed: Aug. 7, 2018

(65) Prior Publication Data
US 2020/0049269 A1    Feb. 13, 2020

(51) Int. Cl.
*E03B 9/04*    (2006.01)
*F16K 17/40*    (2006.01)

(52) U.S. Cl.
CPC ............ *F16K 17/406* (2013.01); *E03B 9/04* (2013.01)

(58) Field of Classification Search
CPC ................................ F16K 17/406; E03B 9/04
USPC ............................................................ 403/2
See application file for complete search history.

(56) References Cited

U.S. PATENT DOCUMENTS

| | | | | |
|---|---|---|---|---|
| 2,018,455 A * | 10/1935 | Lofton | ............... | F16L 23/02 403/47 |
| 3,002,775 A * | 10/1961 | Mueller | ............... | E01F 9/635 403/2 |
| 3,439,947 A * | 4/1969 | Luckenbill | ............... | F16L 23/02 403/2 |
| 3,967,906 A * | 7/1976 | Strizki | ............... | E01F 9/635 403/2 |
| 5,020,934 A * | 6/1991 | Floren | ............... | E03B 9/02 403/2 |
| 6,042,292 A * | 3/2000 | Belanger | ............... | B60S 3/063 403/2 |
| 6,210,066 B1 * | 4/2001 | Dent | ............... | E01F 9/635 248/548 |
| 9,920,840 B2 * | 3/2018 | McGuigan | ............... | F16K 1/02 |
| 10,428,966 B2 * | 10/2019 | Channell | ............... | F16K 17/406 |
| 10,458,481 B2 * | 10/2019 | Li | ............... | F16K 31/46 |

* cited by examiner

*Primary Examiner* — Kevin R Barss
(74) *Attorney, Agent, or Firm* — Brown & Michaels, PC

(57) ABSTRACT

A fire hydrant stem coupling sleeve includes a first end, a second end, and a medial section between the first end and the second end. The first end has external threads; the second end has external threads; the first end and the second end each have fingers defining slots between the fingers; the medial section includes a breaking element to facilitate breaking a rigid connection between the first end and the second end; and the medial section has a locator element configured to locate the sleeve with respect to a fire hydrant stem.

22 Claims, 7 Drawing Sheets

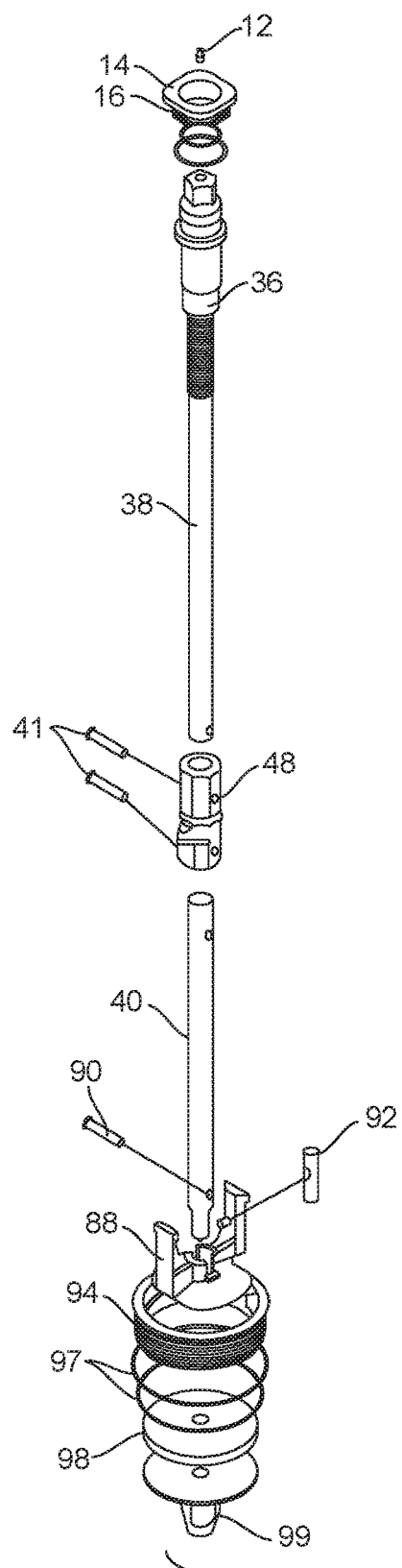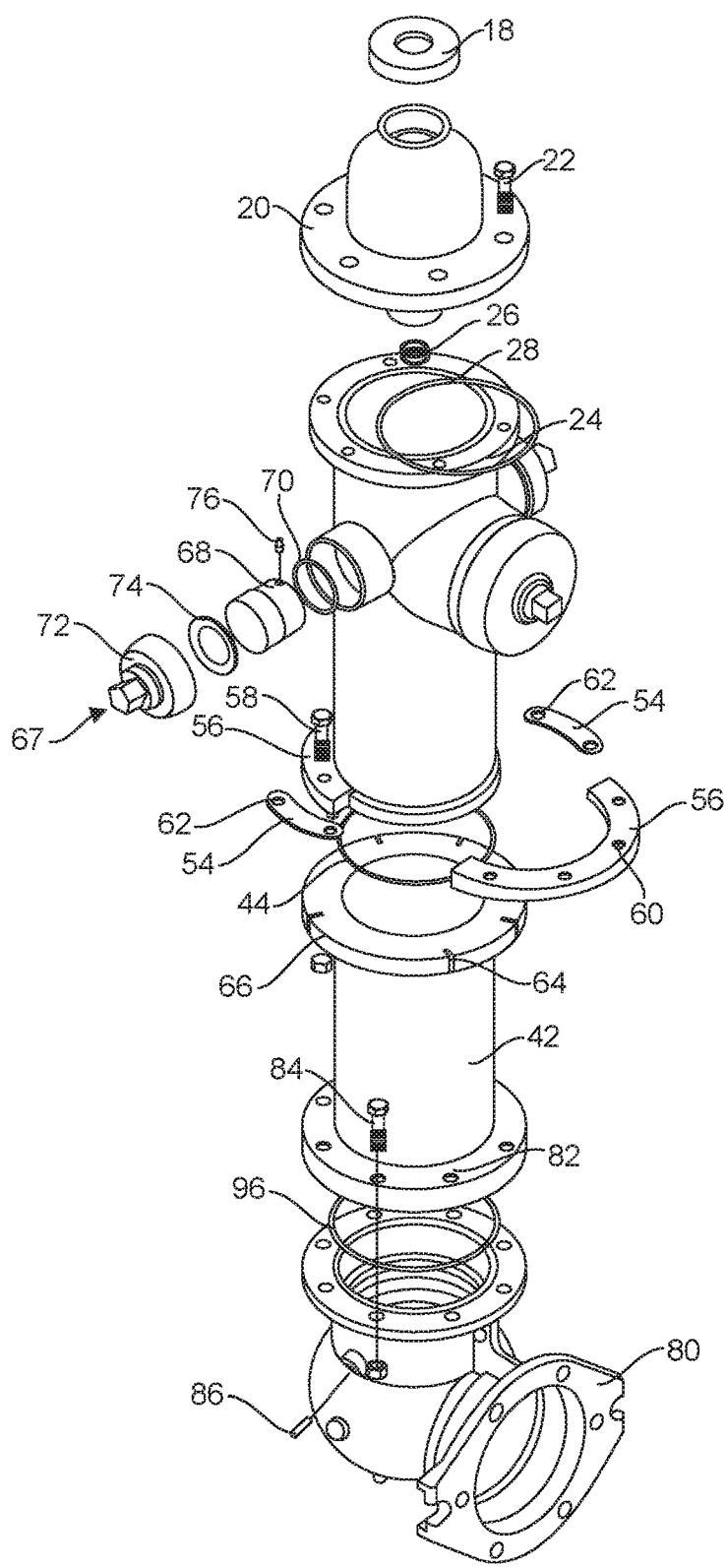
Prior Art
FIG. 1
Prior Art
FIG. 2

STEM COUPLING

BACKGROUND OF THE INVENTION

Field of the Invention

The invention pertains to the field of fire hydrants. More particularly, the invention pertains to a fire hydrant stem coupling that couples an upper stem and a lower stem.

Description of Related Art

In a dry-barrel fire hydrant, an above-ground portion of the hydrant is separated from a pressurized water source by a main valve in a lower barrel or elbow of the hydrant below ground. The upper barrel remains dry until the main valve is opened by means of a long stem that extends from the main valve, through the upper barrel, to the top, or bonnet, of the hydrant.

Fire hydrants typically include one or more breakable coupling components configured to break upon impact by another object, for example, a vehicle colliding with a fire hydrant. The breakable coupling components include, for example, a barrel coupling that couples the upper barrel to the lower barrel. When, for example, a vehicle strikes the upper barrel extending upward from the ground, the barrel coupling shatters along a portion configured to be structurally weaker than other portions of the barrel coupling or other portions of the fire hydrant. When the barrel coupling shatters, the upper barrel is allowed to disengage from the lower barrel, thereby reducing or preventing damage to the upper barrel and the lower barrel.

In order for the upper barrel to separate cleanly from the lower barrel, the stem, which has a lower stem extending from the main valve, through the lower barrel, to the upper barrel, and which has an upper stem extending from the lower barrel, through the upper barrel, to the top or bonnet, must also be separable at the joint between the upper barrel and the lower barrel. Accordingly, a second breakable coupling component—a stem coupling—couples the upper stem to the lower stem. The stem coupling is configured with a breaking element configured to facilitate breaking or shattering of the stem coupling when sufficient impact or force is applied on the upper barrel of the fire hydrant. Conventionally, a stem coupling assembled with an upper stem and a lower stem leaves some physical clearance between the stem coupling and the stems, such that turbulence of water when the hydrant is operated causes vibration of the stem coupling and the stems. This vibration can emanate throughout the entire hydrant, causing extra wear on the various hydrant components, and/or making operation of the hydrant more difficult.

SUMMARY OF THE INVENTION

According to an embodiment of the invention, a fire hydrant stem coupling assembly includes a coupling sleeve, a first coupling nut, and a second coupling nut. The coupling sleeve has a sleeve wall with a first end, a second end, and a medial section between the first end and the second end, the first end having external threads, the second end having external threads, the first end and the second end each having fingers defining slots between the fingers, the medial section including a breaking element to facilitate breaking the rigid connection between the first end and the second end, the sleeve wall defining a first pin hole extending through a diameter of the sleeve wall. The first coupling nut has internal threads configured to threadingly engage the first end. The second coupling nut has internal threads configured to threadingly engage the second end.

According to another embodiment of the invention, a fire hydrant stem coupling sleeve includes a first end, a second end, and a medial section between the first end and the second end. The first end has external threads, the second end has external threads, the first end and the second end each have fingers defining slots between the fingers, the medial section includes a breaking element to facilitate breaking a rigid connection between the first end and the second end, and the medial section has a locator element configured to locate the sleeve with respect to a fire hydrant stem.

According to another embodiment of the invention, a fire hydrant includes an upper stem, a lower stem, a coupling sleeve coupling the upper stem to the lower stem, and a first coupling nut. The coupling sleeve includes a sleeve wall with a first end, a second end, and a medial section between the first end and the second end. The first end has external threads, the second end has external threads, the first end and the second end each have fingers defining slots between the fingers, the medial section includes a breaking element to facilitate breaking the rigid connection between the first end and the second end, and the sleeve wall defines a locator element. The first coupling nut has internal threads configured to threadingly engage the sleeve wall.

BRIEF DESCRIPTION OF THE DRAWINGS

FIG. 1 shows a stem and valve assembly of a prior art fire hydrant.

FIG. 2 shows a barrel assembly of the fire hydrant of FIG. 1.

DETAILED DESCRIPTION OF THE INVENTION

Figure 3:
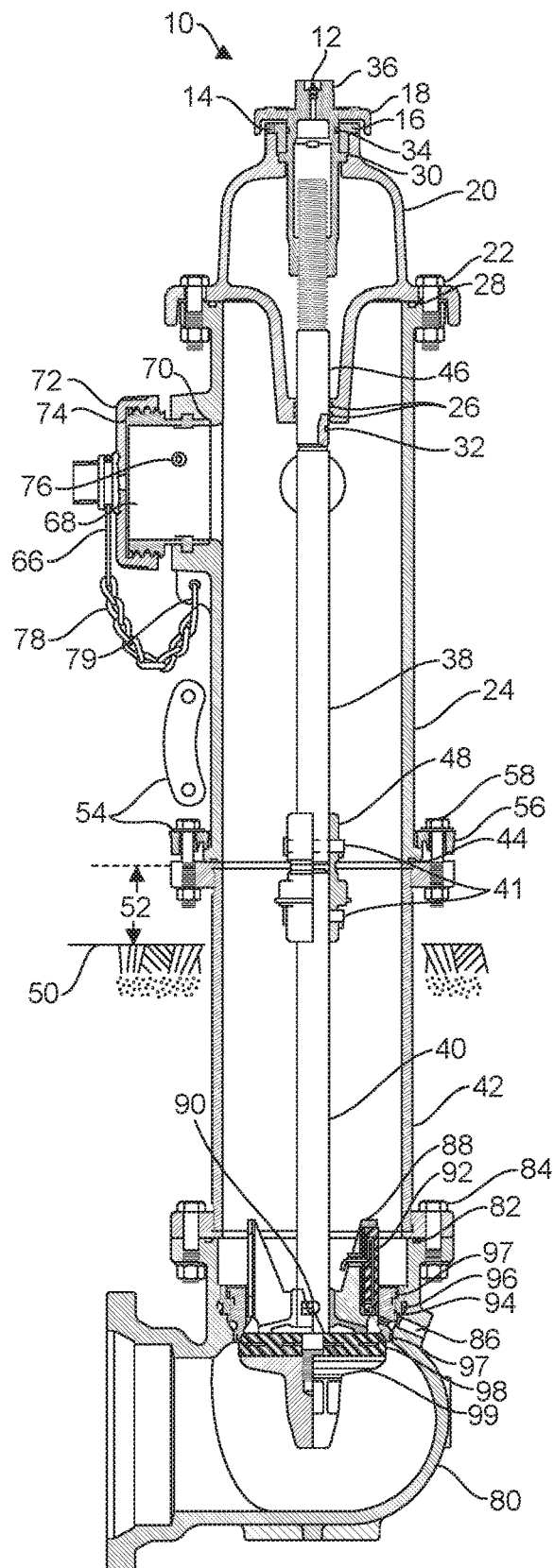
FIG. 3 shows a cross-sectional view of the fire hydrant of FIGS. 1 and 2.

FIGS. 1, 2, and 3 show a prior art fire hydrant 10. FIG. 1 illustrates internal components, FIG. 2 illustrates external components, and FIG. 3 shows a cross section of the assembled hydrant, including the internal and external components of FIG. 1 and FIG. 2. The fire hydrant 10 includes a fitting 12 and a fastener 14, 16 such as an Allen head set screw 14 and a nut 16. A dirt shield 18 fits onto a hydrant cap 20. Cap fasteners 22, such as bolts and nuts, fasten the hydrant cap 20 to an upper barrel 24. The hydrant 10 also includes an O-ring 26 and a hydrant cap gasket 28. A washer 30, for example a thrust washer, facilitates the connections in the cap portion of the fire hydrant. O-rings 32, 34 seal various portions of the fire hydrant 10.

An operating stem nut 36 connects an upper stem 38 to the cap portions of the fire hydrant 10. The upper stem 38 is located in the center of the upper barrel 24 and a lower stem 40 is located in the center of the lower barrel 42. An O-ring 44 creates a seal between the upper barrel 24 and the lower barrel 42. A stem ferrule, ring or cap 46 is preferably located on an upper end of the upper stem 38. A stem coupling assembly 48 connects between the upper stem 38 and the lower stem 40, held to each by coupling pins 41. The stem coupling assembly 48 is preferably located directly above the ground line 50. FIG. 3 shows a distance 52 between the stem coupling assembly 48 and the ground line 50. In some fire hydrants, this distance 52 is approximately three inches.

In some embodiments, a barrel coupling includes two breaker straps 54 and two breaker rings 56. Each breaker strap 54 connects to the ends of the two breaker rings 56 to keep the breaker rings 56 in place. A bolt or other fastener 58 goes through holes 60 in the breaker ring 56, through holes 62 in the breaker strap 54, and into a hole 64 in a flange 66 of the lower barrel 42. The breaker straps 54 pick up the outer holes 22 in each side of the two half moon breaker rings 56.

A hose connects to the fire hydrant 10 at a nozzle assembly 67, which includes a nozzle 68, an O-ring 70, a nozzle cap 72, a nozzle cap gasket 74, and a nozzle retaining screw 76. The nozzle 68 also can include a nozzle cap chain 78 and a nozzle chain hook 79, for example an S-hook, which connects one end of the chain 78 to the body of the fire hydrant 10.

An elbow 80 includes a seal 82 and fasteners 84. The fire hydrant 10 also includes a drain tube 86. A drain valve 88 includes a drain valve pin 90, and a drain valve facing with inserts 92. A seat ring 94 includes a seat ring insert 96. Seals, such as O-rings 97, seal the seat ring 94 to the main valve 98. A bottom plate 99 sits within the elbow 80. In FIG. 3, the drain hole in the drain tube 86 is shown rotated 90 degrees. The elbow (shoe) 80 and the bottom plate 99 are preferably epoxy coated in accordance with regulations.

Figure 4:
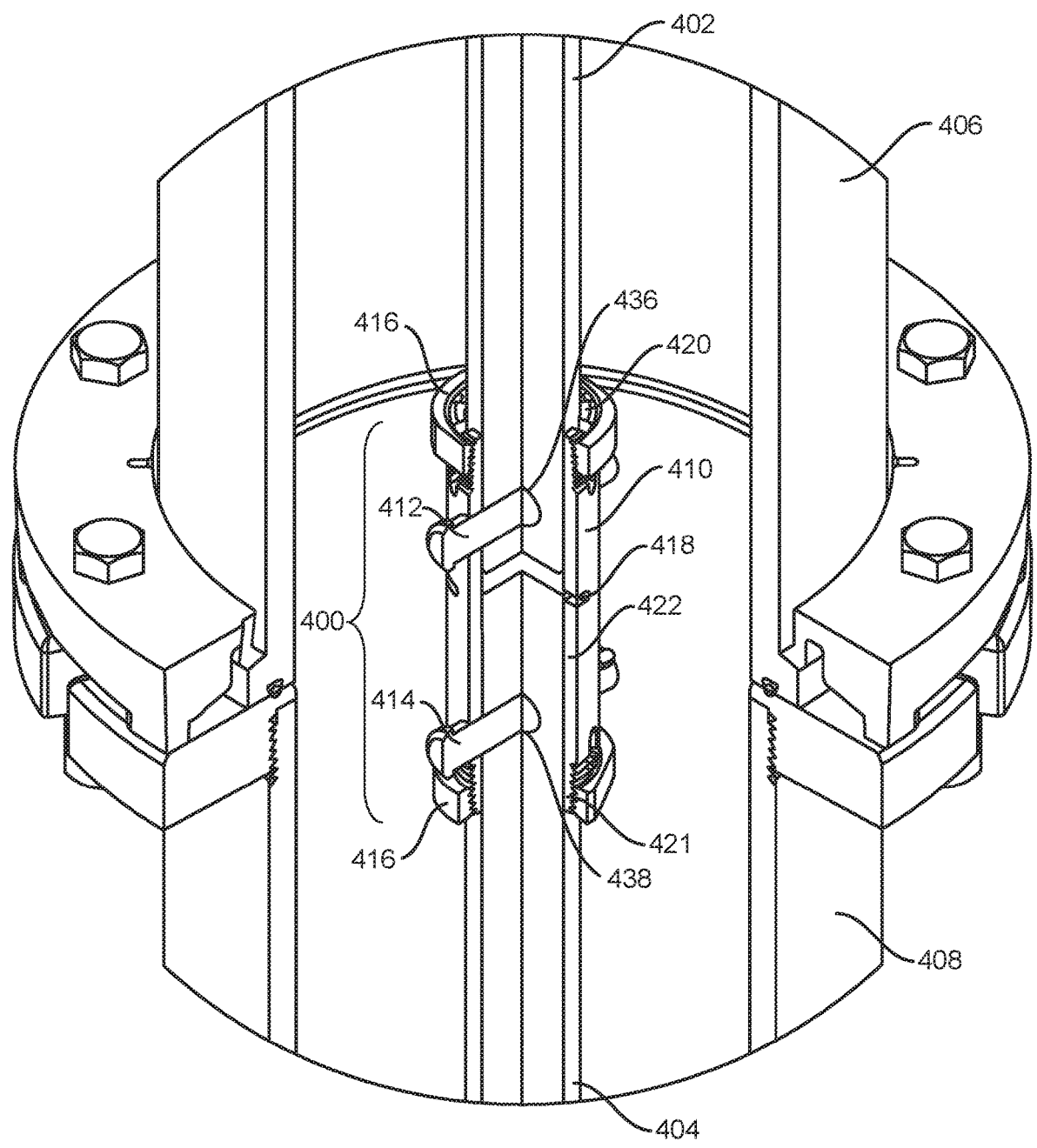
FIG. 4 shows a close up partial sectional, isometric view of a stem coupling assembly, according to an embodiment of the invention.

FIG. 4 shows a stem coupling assembly 400 between an upper stem 402 and a lower stem 404, according to an embodiment of the invention. As part of a fire hydrant, as shown in FIG. 4, the upper stem 402 and the lower stem 404 meet at approximately the same plane where an upper barrel 406 meets a lower barrel 408. The stem coupling assembly 400 includes a coupling sleeve 410 coupling the upper stem 402 to the lower stem 404, a first pin 412 inserted through the coupling sleeve 410 and the upper stem 402, a second pin 414 inserted through the coupling sleeve 410 and the lower stem 404, and a coupling nut 416 secured to each end of the coupling sleeve 410. The first and second pins 412, 414 position the coupling sleeve 410 in place with respect to the upper stem 402 and the lower stem 404, aligning a breaking element 418 on a plane with the union of the upper stem 402 and the lower stem 404, and with the union of the upper barrel 406 and the lower barrel 408. The coupling nuts 416 compress fingers 420 at each end of the coupling sleeve 410, securing the fingers 420 of the coupling sleeve 410 without clearance against the upper stem 402 and the lower stem 404, and reducing or preventing slop, jiggling, or rattling of the coupling sleeve with respect to the upper and lower stems 402, 404. This snug fit of the stem coupling assembly 400 with the upper and lower stems 402, 404 reduces or prevents vibration of the stem coupling assembly 400 and the upper and lower stems 402, 404.

Figure 5:
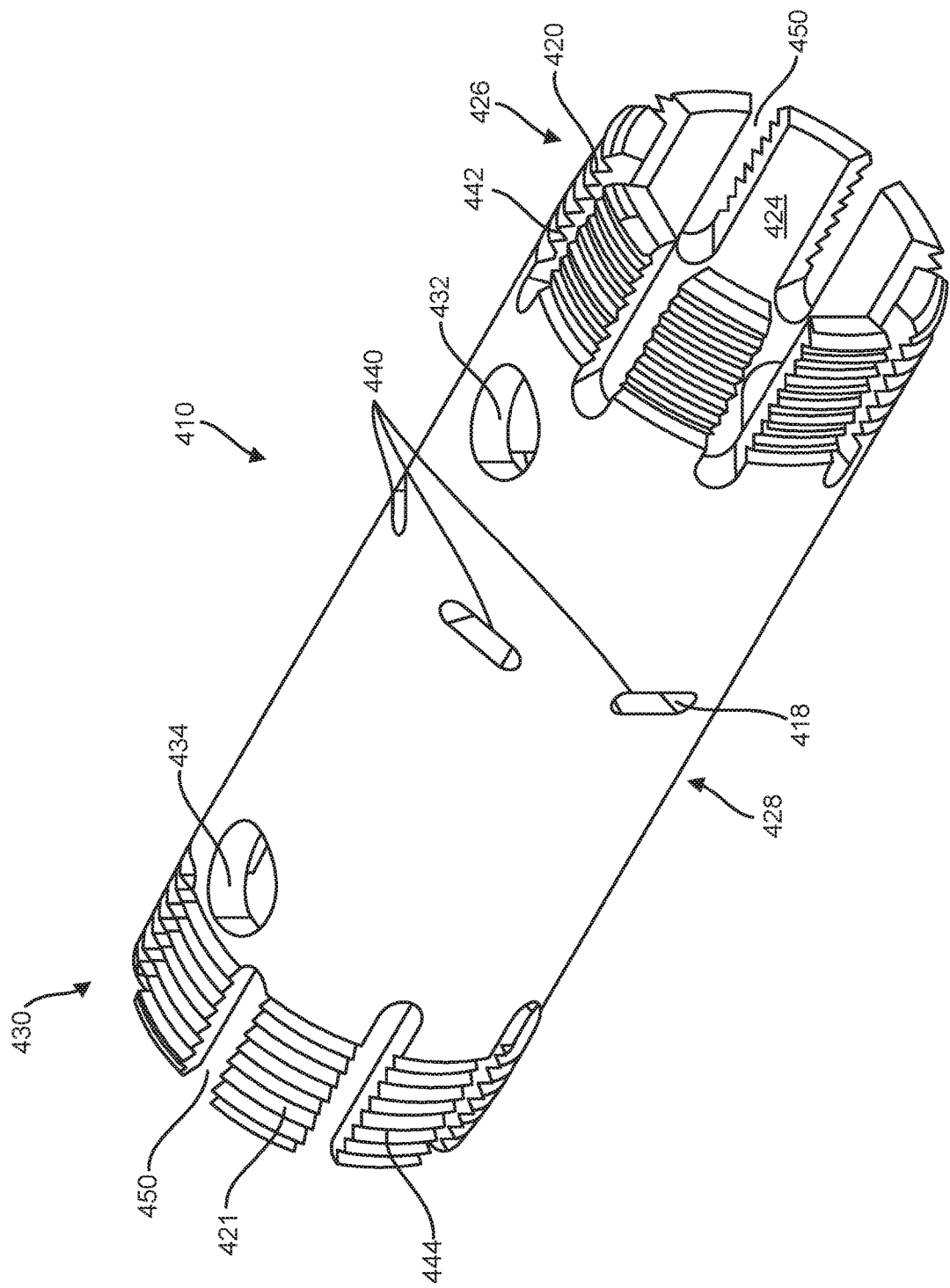
FIG. 5 shows a perspective view of a stem coupling sleeve according to an embodiment of the present invention.
Figure 6:
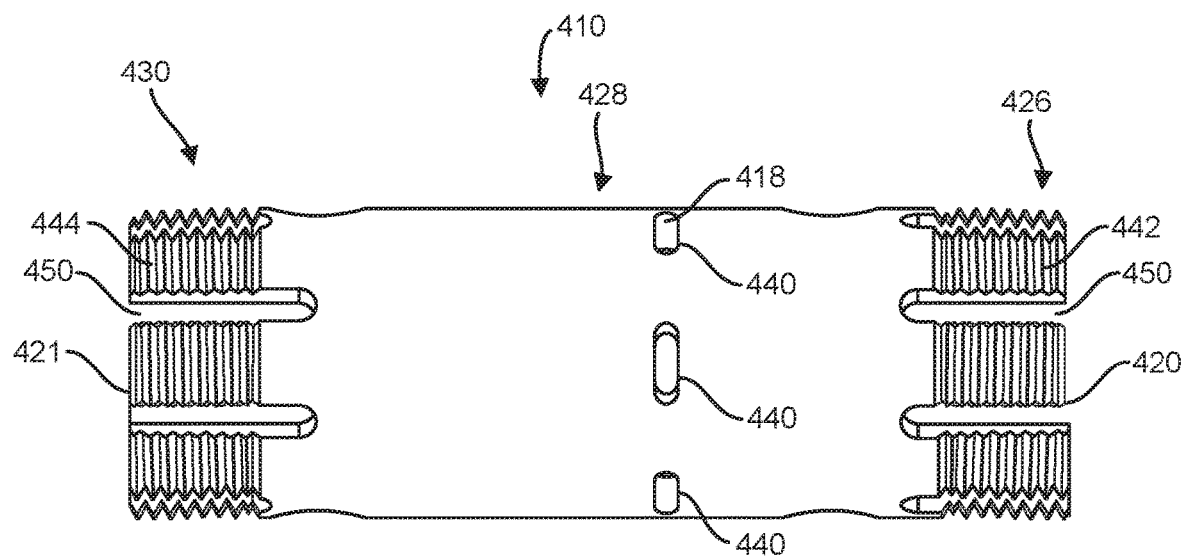
FIG. 6 shows a side view of the stem coupling sleeve according to the embodiment of FIG. 5.
Figure 7:
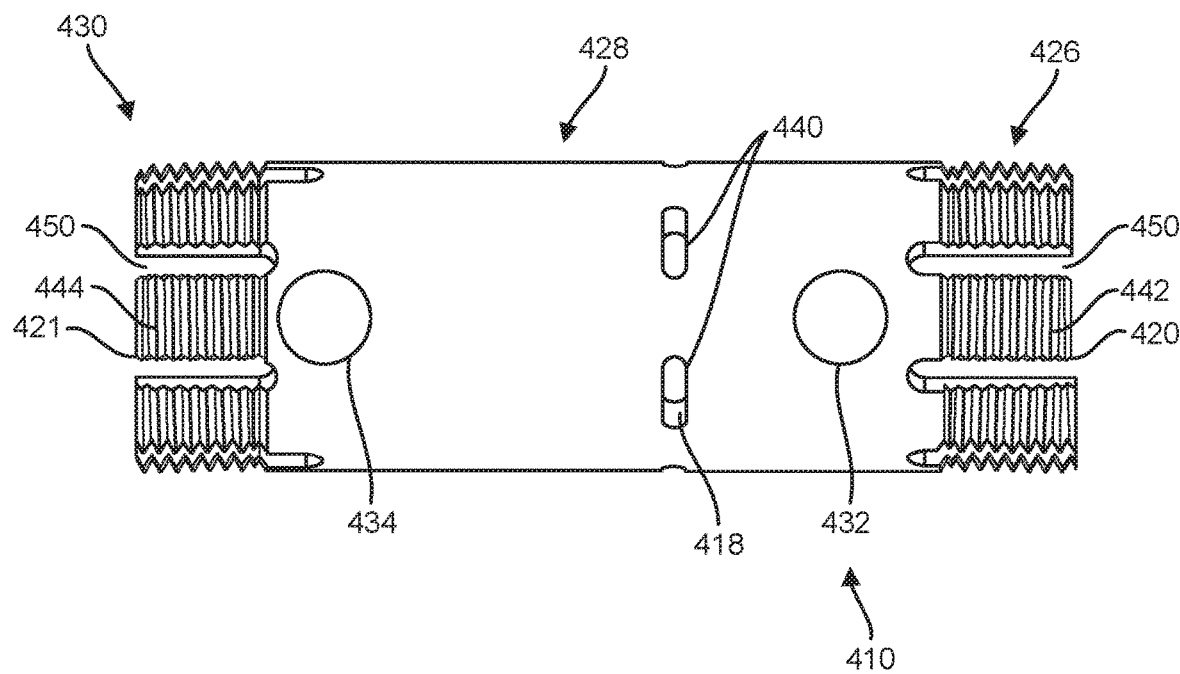
FIG. 7 shows another side view of the stem coupling according to the embodiment of FIG. 5.
Figure 10:
FIG. 10 shows a side sectional view of the coupling nut of the embodiment of FIG. 8.
Figure 9:
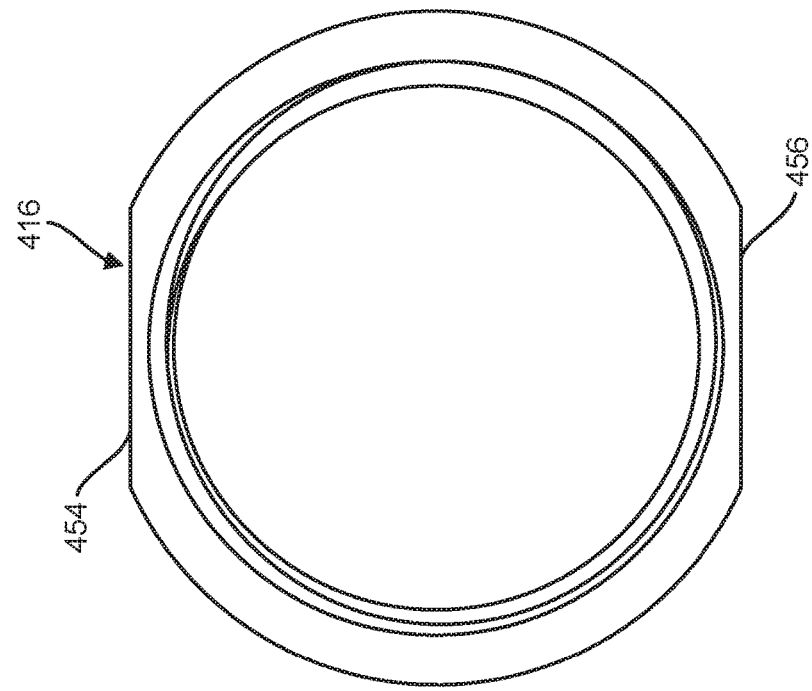
FIG. 9 shows a top view of the coupling nut of the embodiment of FIG. 8.
Figure 8:
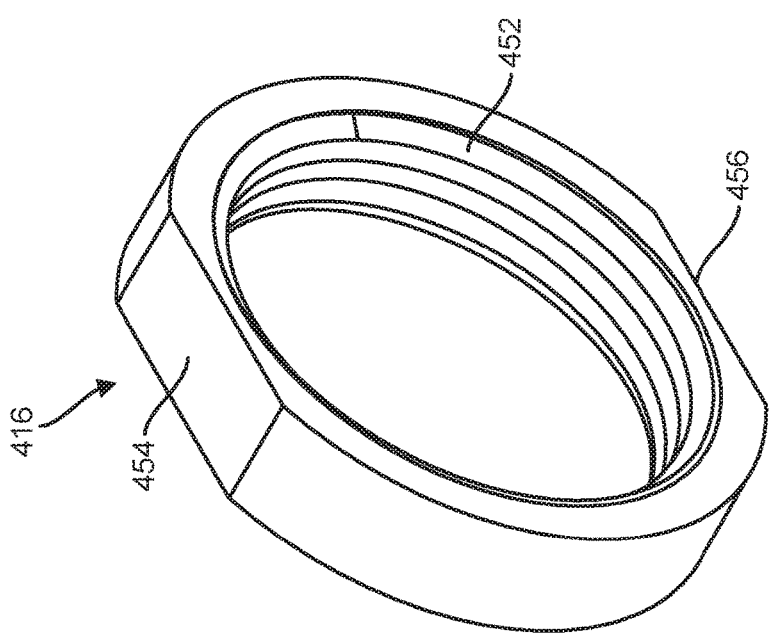
FIG. 8 shows a perspective view of a coupling nut according to an embodiment of the invention.

Various views of the coupling sleeve 410 are shown in FIGS. 5-7, and various views of the coupling nut 416 are shown in FIGS. 8-10. Referring to FIGS. 4-7, the coupling sleeve 410 has an annular sleeve wall 422 defining a center hollow 424 into which the upper stem 402 and the lower stem 404 can be inserted. The upper stem 402 can be inserted through a first end 426 into a medial section 428 between the first end 426 and a second end 430. The lower stem 404 can be inserted through the second end 430 into the medial section 428. Each stem 402, 404 can be inserted so that the stems 402, 404 meet at the breaking element 418. The coupling sleeve 410 can have a locator element to locate or align the coupling sleeve 410 with respect to the stems 402, 404. In the depicted embodiment, the locator element includes first and second alignment holes 432, 434, which in conjunction with first and second pins 412, 414, facilitate the proper amount of insertion of the upper and lower stems 402, 404 such that the stems 402, 404 meet at the breaking element 418. The first and second holes 432, 434 each extend through a wall of the stem coupling sleeve 410, or through an entire diameter of the coupling sleeve 410. In other words, the alignment holes 432, 434 can extend through opposing portions of the sleeve wall 422 separated by 180 degrees. The axial position of the holes 432, 434 determine the position of the upper and lower stem 402, 404 with respect to the coupling sleeve 410 because the first and second pins 412, 414 extend through the first and second holes 432, 434, and then through pin-receiving holes 436, 438 in the upper and lower stems 402, 404. The position of the holes 432, 434 can vary depending on the position of the pin-receiving holes 436, 438 in the upper and lower stems 402, 404, the position of the breaking element 418, and the length of the medial section 428, amongst other potential factors. The first alignment hole 432 can be between the first end 426 and the breaking element 418, and the second alignment hold 434 can be between the second end 430 and the breaking element 418. While the illustrated embodiment has alignment holes 432, 434, other now-known or future-developed structures can be used to position the stem coupling sleeve 410 relative to the stems 402, 404.

The breaking element 418 can be configured variously in the medial section 428 to facilitate breaking the rigid connection between the first end 426 and the second end 430 when the first end 426 and second end 430 are subjected to a threshold force differential, and to allow the first end 426 to split apart from the second end 430. In the depicted embodiment, the breaking element 418 includes a series of slots 440 in the sleeve wall 422 oriented or aligned on a circumference of the coupling sleeve 410. The slots 440 can also be recesses, openings, perforations, cavities, indentations, or a weaker material than the majority of the coupling sleeve 410.

Still referring to FIGS. 4-7, the first end 426 of the coupling sleeve 410 can have first external threads 442 and the second end 430 of the coupling sleeve 410 can have second external threads 444. The first end 426 and the second end 430 also have the fingers 420, 421 defining finger-separating slots 450 between the fingers 446, 448. The fingers 446, 448 are elastically bendable and can be compressed against the upper and lower stem 402, 404 to stabilize the coupling sleeve's connection of the upper and lower stems 402, 404, and to reduce or eliminate chattering, jiggling, rattling, or other movement of the coupling sleeve 410 with respect to the upper and lower stems 402, 404. A coupling nut 416 can be threaded onto (e.g., threadingly engage) each set of fingers 420, 421 to compress the fingers 420, 421 radially inward. Each set of threads 442, 444 can extend axially less than a total length of the respective set of fingers 420, 421 across/around which they spiral, or the threads 442, 444 can extend an equal or greater length. Having threads 442, 444 shorter than the fingers 420, 421 can prevent screwing the coupling nut too far, off the fingers 420, 421, where it would no longer exert radially inward force on the fingers 420, 421.

If either hole 432, 434 is positioned closely to the fingers 420, 421, then one or more of the finger-separating slots 450 can be shortened to allow more room and structural integrity surrounding the hole 432, 434.

Referring to FIGS. 4-10, the coupling nut 416 has internal threads 452 and a tool-actuated element, which in the illustrated embodiment, includes two flat, parallel, external surfaces 454, 456 which can be gripped on opposing exterior sides of the coupling nut 416 by a wrench. The internal threads 452 are configured to thread into the first and second external threads 442, 444 of the sleeve wall 422.

While first and second external threads 442, 444 and the coupling nut 416 are illustrated and described as an example embodiment, any now-known or future-developed element to compress the fingers 420, 421 can be used as an alternative. For example, the first and second external threads 442, 444 can be omitted, and a circular clamp (not shown) can replace the coupling nut 416.

Figure 11:
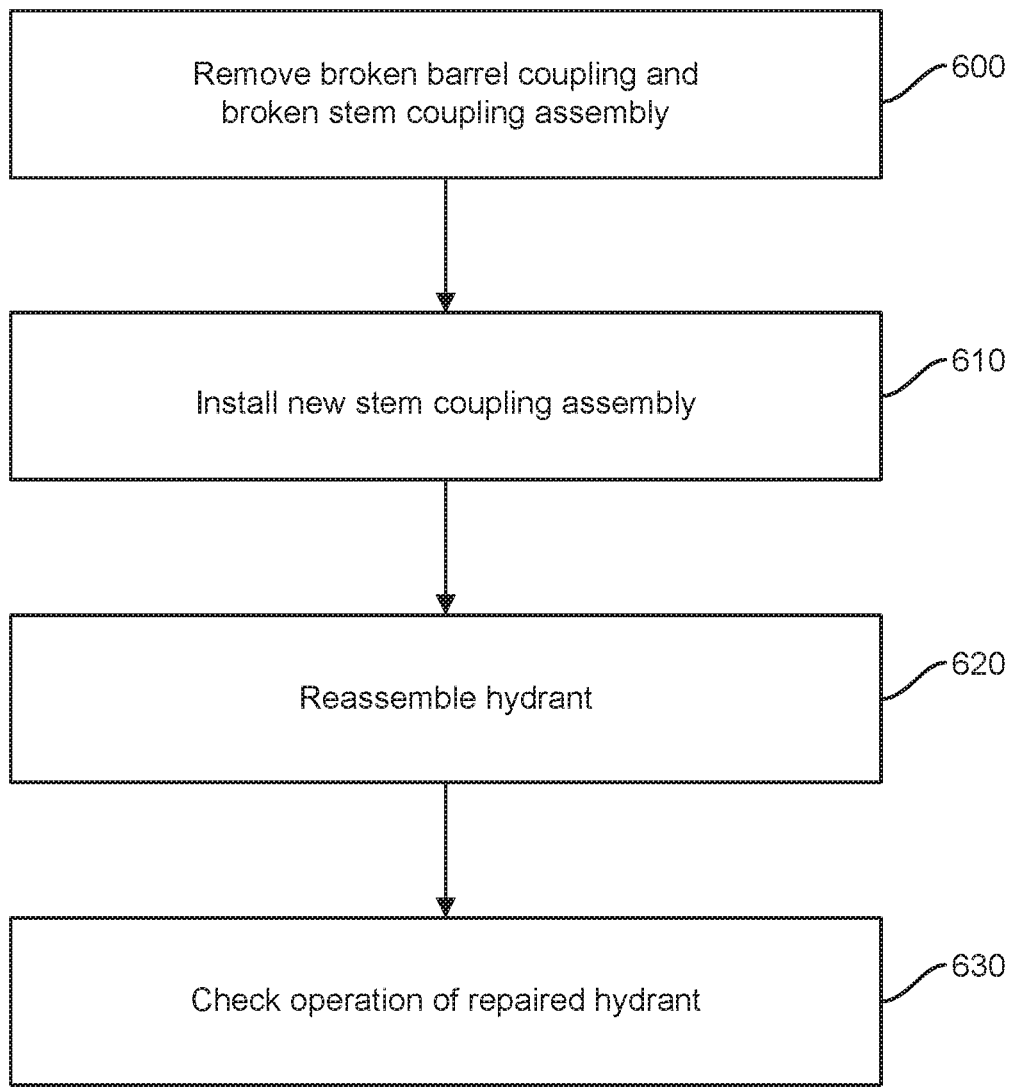
FIG. 11 shows a method of repairing a fire hydrant after impact.

FIG. 11 shows a method of repairing a fire hydrant after impact. To repair a broken stem coupling, according to step 600, remove the broken barrel coupling (breaker straps 54 and breaker rings 56) and the broken stem coupling 48. With a socket wrench, remove the bolts 58 holding the broken breaking rings 56 and remove the pieces, along with the breaker straps 54. Lay the upper portion of the fire hydrant 10 safely on the ground. To remove the upper stem 38 from the upper barrel 24 of the hydrant 10, unscrew the upper stem 38 from the operating stem nut 36 by holding the upper stem 38 stationary and turning the operating stem nut 36 in a direction to open. Remove the upper coupling pin 41 and the broken upper portion of the stem coupling 48 from the upper stem 38. Also remove the lower coupling pin 41 and the broken lower portion of the stem coupling 48 from the lower stem 40.

To install a new stem coupling assembly 400, according to step 610, place a coupling nut 416 and a coupling sleeve 410 on the upper stem 38, and secure the coupling sleeve 410 with a first pin 412. Place a coupling nut 416 around the lower stem 40. Move the upper stem 38 to slide the lower stem 40 into the coupling sleeve 410, securing the coupling sleeve 410 with a second pin 414. Screw the coupling nuts 416 onto the first end 426 and the second end 430 of the coupling sleeve 410, thereby tightening the fingers 446, 448 around the upper and lower stems 38, 40.

To remove the cap 20 from the upper portion of the hydrant 10, place the upper barrel 24 of the hydrant 10 on a clean surface, such as cardboard. With a socket wrench, remove the bolts 22 holding the cap 20 to the upper barrel 24 and remove the cap 20.

To reassemble the hydrant 10, according to step 620, check the O-ring 44 on the bottom of the hydrant upper barrel 24 and replace the O-ring 44 if damaged. Set the hydrant upper barrel 24 over the upper stem 38 and orient the nozzles 68 in the direction required. Place the breaker rings 56 on the flange 66 of the lower barrel 42 and around the upper barrel 24. Align the holes 62 in the breaker straps 54 with the holes 60 in the breaker rings 56. Replace the bolts 58 in the breaker rings 56 and breaker straps 54, aligning the holes 60 in the breaker rings 56 with the holes 62 in the breaker straps 54 and placing the breaker straps 54 directly below the head of the fasteners 58.

Replace the hydrant cap gasket 28 and lower the cap 20 over the upper stem 38. Be careful not to damage the O-rings 26 in the cap 20. Start the upper stem 38 into the stem operating nut 36 by turning the stem operating nut 36 in the direction to close. Turn until the cap 20 is seated on the upper barrel 24. Replace the cap bolts 22 and tighten. Tighten the bolts 58 evenly to 30-45 ft. per pound. Check for free operation in step 630 by cycling the hydrant 10 from fully open to fully closed.

While a specific design for a fire hydrant 10 is shown in the figures and described with respect to the figures, other fire hydrant models that use a breaking coupling assembly to withstand vehicular or other impacts can use the stem coupling assembly 400 described herein.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A fire hydrant stem coupling assembly comprising:
    a coupling sleeve having a sleeve wall with a first end, a second end, and a medial section between the first end and the second end, the first end having external threads, the second end having external threads, the first end and the second end each having fingers defining slots between the fingers, the medial section including a breaking element to facilitate breaking the rigid connection between the first end and the second end, the sleeve wall defining a first pin hole extending through a diameter of the sleeve wall;
    a first coupling nut having internal threads configured to threadingly engage the first end; and
    a second coupling nut having internal threads configured to threadingly engage the second end.

2. The fire hydrant stem coupling assembly of claim 1, wherein the breaking element includes recesses or openings in the sleeve wall.

3. The fire hydrant stem coupling assembly of claim 2, wherein the recesses or openings are oriented along a circumference.

4. The fire hydrant stem coupling assembly of claim 1, wherein at least one finger of the first end is shorter than at least one other finger of the first end to make room for location of the first pin hole.

5. The fire hydrant stem coupling assembly of claim 1, wherein at least one of the fingers on the second end spans a greater axial length than the external threads on the second end.

6. The fire hydrant stem coupling assembly of claim 1, wherein the coupling sleeve has an internal diameter configured to receive insertion of a fire hydrant stem.

7. The fire hydrant stem coupling assembly of claim 1, wherein the coupling sleeve further comprises a second pin hole extending through a diameter of the sleeve wall, the first pin hole located between the first end and the breaking element, the second pin hole located between the second end and the breaking element.

8. A fire hydrant stem coupling sleeve comprising:
    a first end;
    a second end; and
    a medial section between the first end and the second end, the first end having external threads, the second end having external threads, the first end and the second end each having fingers defining slots between the fingers, the medial section including a breaking element to facilitate breaking a rigid connection between the first end and the second end, the medial section having a locator element configured to locate the sleeve with respect to a fire hydrant stem.

9. The fire hydrant stem coupling sleeve of claim 8, wherein the locator element includes a pin hole defined by the sleeve.

10. The fire hydrant stem coupling sleeve of claim 8, wherein the breaking element includes recesses or openings in a wall of the sleeve.

11. The fire hydrant stem coupling sleeve of claim 10, wherein the recesses or openings are oriented on a circumference of the sleeve.

12. The fire hydrant stem coupling sleeve of claim 8, wherein at least one finger of the first end is shorter than at least one other finger of the first end to make room for location of the pin hole.

13. The fire hydrant stem coupling sleeve of claim 8, wherein at least one of the fingers on the second end spans a greater axial length than the external threads on the second end.

14. The fire hydrant stem coupling sleeve of claim 8, wherein the coupling sleeve further comprises an internal diameter configured to receive insertion of a fire hydrant stem.

15. A fire hydrant comprising:
an upper stem;
a lower stem;
a coupling sleeve coupling the upper stem to the lower stem, the coupling sleeve including:
  a sleeve wall with a first end, a second end, and a medial section between the first end and the second end, the first end having external threads, the second end having external threads, the first end and the second end each having fingers defining slots between the fingers, the medial section including a breaking element to facilitate breaking the rigid connection between the first end and the second end, the sleeve wall defining a locator element; and
a first coupling nut having internal threads configured to threadingly engage the sleeve wall.

16. The fire hydrant of claim 15, wherein the breaking element includes recesses or openings in the sleeve wall.

17. The fire hydrant of claim 16, wherein the recesses or openings are oriented on a circumference of the coupling sleeve.

18. The fire hydrant of claim 15, wherein at least one finger of the first end is shorter than at least one other finger of the first end to make room for location of the pin hole.

19. The fire hydrant of claim 15, wherein at least one of the fingers on the second end spans a greater axial length than the external threads on the second end.

20. The fire hydrant of claim 15, further comprising a first coupling nut having internal threads configured to threadingly engage the first end.

21. The fire hydrant of claim 20, further comprising a second coupling nut having internal threads configured to threadingly engage the second end.

22. The fire hydrant of claim 15, wherein the locator element includes a pin hole extending through the sleeve wall, the pin hole located between the first end and the breaking element or between the second end and the breaking element.

* * * * *